Sept. 20, 1966    R. G. MARTZ    3,273,502
PUMPING AND METERING DEVICE
Filed Feb. 24, 1964
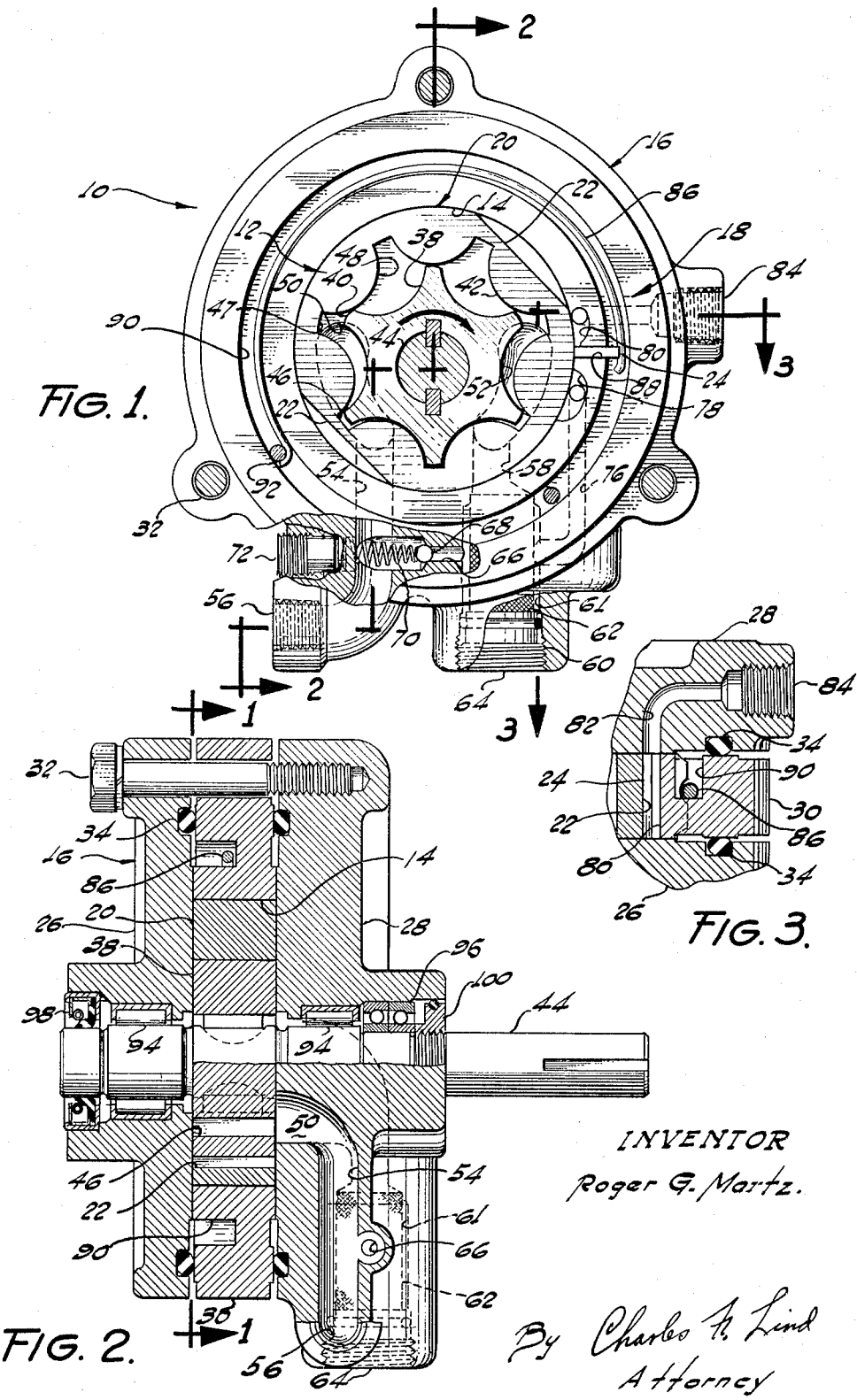
INVENTOR
Roger G. Martz.
By Charles F. Lind
Attorney

3,273,502
PUMPING AND METERING DEVICE
Roger G. Martz, Lebanon, Ind., assignor to Stewart-Warner Corporation, Chicago, Ill., a corporation of Virginia
Filed Feb. 24, 1964, Ser. No. 346,644
2 Claims. (Cl. 103—5)

This application relates to a pumping and metering device, and particularly to one of low cost usable at such operating speeds to be driven directly by an electric motor and having design capacity, if desired, to draw oil against suction equivalent to 25" of mercury and simultaneously meter accurately continuous flow rates of .3 gallon per hour.

In many commercial applications, it is desired to pump a liquid to some pressure and to meter the liquid under the pressure accurately and consistently. Of particular concern, however, is the cost for each pumping and/or metering device, the size of the device, and its operating speed such as being suitable or not for direct drive by a conventional electric motor.

For example, the comparative use of oil or gas as a fuel is determined by cost; and oil burning equipment is generally more expensive than gas burning equipment. This differential in cost is attributed to the fact that oil must be stored and pumped, neither of which is required in gas burning equipment. Also, the oil flow rate for low output oil burning equipment, such as a domestic water heater of 40,000 B.t.u./hr., is approximately .3 gallon per hour so that accurate metering becomes a problem. Underwriter's Laboratory specifications also require that an oil fired burner have a lift pump capable of drawing against suction equivalent to 25" of mercury. Of practical significance also, the pumping and metering device must be workable in both a one or two pipe system from the oil storage tank to the oil burning equipment, such as to prime the oil lines rapidly after extended periods of non-use.

Accordingly, an object of this invention is to provide a low cost pumping and metering device which by design can draw oil against suction equivalent to 25" Hg of mercury and which can simultaneously meter accurately continuous flow rates of .3 gallon per hour.

Another object of this invention is to provide a pumping and metering device which can be driven at speeds of 1800 r.p.m. or higher for direct connection, if desired, to a driving electric motor.

Another object of this invention is to provide a pumping and metering device which can be fabricated generally of commercially available components at a low cost, and which is of small physical size and driving power requirements, suitable for use in a competitively priced oil burning appliance of low heat output.

In order that these objects can be more fully appreciated, reference is herein made to the accompanying drawings wherein:

FIG. 1 is an elevational view, partly in section as taken from line 1—1 of FIG. 2, of a preferred embodiment of the subject pumping and metering device;

FIG. 2 is a sectional view taken generally from line 2—2 of FIG. 1; and

FIG. 3 is a partial section taken generally from line 3—3 of FIG. 1.

The preferred embodiment of the subject device 10 includes pumping means 12 confined within an appropriate cavity 14 of housing 16, and metering means 18 connected to the outlet of the pumping means 12 and formed by a rotating member 20 of the pumping means having one or more flats each defining a peripheral metering chamber 22 which a vane 24 supported by housing 16 sweeps of fluid as the member 20 rotates.

Structurally, the device 10 includes the housing 16 having spaced end plates 26 and 28 sandwiching an annular ring member 30, all of which are held together by bolts 32. O-rings 34 received in annular grooves in the end plates seal the defined cavity 14.

The pumping device 12 preferably is a gerotor gear set having the outer gear or gerotor member 20 complementarily received within the cylindrical cavity 14 to rotate therein. As is well known, the inner gear or gerotor member 38 positioned within the outer gerotor member 20 has one less tooth element (such as 40) than the number of tooth elements (such as 42) of the outer gerotor member, as in this case, six elements 40 as compared to seven elements 42. The teeth 40 and 42 are contoured so that at all times there is a fluid tight line contact between the inner and outer gerotor members to define a similar number of fluid chambers (such as 46, 47 and 48) as the number of teeth on the inner member. The inner member 38 is keyed to shaft 44 to rotate eccentrically of the cylindrical cavity 14 and the outer member 20, and to rotate thereby the outer member in the same direction a fractional speed proportional to the ratio of teeth on the outer and inner gear members.

As the shaft 44 and the gerotor gear set rotate, the chambers 46, 47 and 48 move within the housing, increasing in size for half of the full revolution and thereafter decreasing in size the remainder of the revolution. Inlet and outlet ports, 50 and 52 respectively, in the end plate 18 open to the chambers 46-48 provide for fluid transfer through the unit during successive pumping cycles. The inlet port 50 communicates through bore 54 in the housing plate 28 to a threaded tap 56 for ready connection to an inlet pipe or the like (not shown) from the fluid sump or tank (not shown). The outlet port 52 communicates through internal bore 58 and chamber 61 to a threaded tap 60. A filter 62 is positioned within the chamber 61 and the tap 60 commonly is closed by plug 64. Bypass bore 66 in the housing communicates the outlet chamber 61 with the inlet bore 54 (as shown best in FIGS. 1 and 2). Pressure relief means such as ballcheck 68 held closed by compression spring 70, closes the bore 66 to prevent direct short circuiting across the outlet chamber 61 and the inlet bore 54. The pressure at which ballcheck 68 opens is adjustable by threading plug 72 more or less in its receiving bore to vary the force of spring 70.

Internal bore 76 communicates chamber 61 also to an inlet port 78 extending axially of the cavity 14 at the periphery of the outer gerotor member 20. The gerotor 20 is provided, as above mentioned, with at least one flat to define chamber 22 which upon passing the inlet port 78 is filled with fluid. An outlet port 80 communicates likewise with the cavity 14 and is proximate the vane 24 to provide the outlet for the fluid from the peripheral chamber 22. Bore 82 communicates the outlet port 80 with internally threaded tap 84, which is the outlet for metered flow from the unit 10. The vane 24 slides within a radial slot 88 in the housing, and spring 86 received in a central notch on the vane 24 biases the vane against the member 20. The spring 86 fits in an annular groove 90 in the ring member 30 and is contoured around dowel pin 92 to preclude rotation within the groove.

The shaft 44 is supported within the housing 16 by spaced roller bearings 94 and axial thrust bearings 96. Seal means 98 between the end plate 26 and the shaft 44, and seal means 100 threaded onto the shaft against the axial thrust bearings 96 seal the cavity 14 at the opposite ends of the shaft against leakage.

In operation an inlet line (not shown) is connected from a sump or supply tank (not shown) to the inlet tap 56. The fluid is drawn by the expanding action of each of the defined fluid chambers (such as 46, 47, 48) of the gerotor set 12 through the inlet port 50 and subsequently forced out the outlet port 52 to the fluid chamber 61. Excessive quantities or the fluid over that needed for the metering means 18 are bypassed through the bore 66 past the check means 68, or from the tap 60 if such is desired and the plug 64 is removed as required. The bypass check also regulates the maximum pressure within the chamber 61, which is adjustable by adjusting the plug 72 to vary the force of spring 70.

The inlet port 78 of the metering device thus senses a generally constant fluid pressure to fill with consistent regularity each peripheral fluid chamber 22 within the cavity 14. The vane 24 sweeps the fluid from the chamber 22 upon rotation of the outer gerotor member 20 to meter from the outlet tap 84 a precise volume of fluid. The flow rate is determined merely by the volume of the chamber 22 at the flat, the number of such chambers, and the number of rotating cycles of the outer gerotor member 20. The operating speed of shaft 44 can be sufficiently high to permit direct connection to some driving motor (not shown). A device similar to that disclosed herein, for example, has metered uniform flow rates as low as .3 gallon per hour varying only plus or minus 5% for fluid inlet conditions varying between 25" of mercury suction and positive pressure of 15 p.s.i.g.

It will be understood that other combinations can be made with this basic disclosure without departing from the inventive concept thereof. For example, the outlet from chamber 61 can provide external check arrangements for bypass directly to a sump (not shown). Similarly the number and spacing of vanes such as 24 can vary, as well as the number and spacing of peripheral chambers 22. In fact, more than one vane 24 can be used and separate, in series, or parallel flow streams can be maintained. Also, the metering unit can be used with varying pumping means, or by itself if the suction requirements are not critical. Accordingly, it is desired that the invention be limited only by the scope of the claims hereinafter following.

What is claimed is:

1. In combination, a pumping and metering device for drawing against at least 25" Hg suction and metering accurately continuous flow rates as low as .3 gallon per hour, comprising a housing having an internal cylindrical cavity, a pumping means including a gear set consisting of outer and inner gear members with said outer gear member having a plurality of internal teeth and said inner gear member having a different plurality of external teeth progressively engaged with the teeth of said outer gear member in response to rotation relative each other within the cavity to solely define a plurality of variable sized rotatable liquid oil pumping chambers, shaft means to support the inner gear member eccentrically of the outer gear member and housing cavity and to drive the gear set within the housing, inlet and outlet porting means adjacent and open to the gear set operable to provide for fluid transfer through the defined pumping chambers, a metering means including a cylindrical periphery on the outer gear member having at least one flattened portion on its cylindrical periphery which defines within the cavity at least one peripheral chamber of relatively small fixed volume, a vane of width equal to the axial length of the defined peripheral chamber, means for biasing said vane to engage the periphery of the outer gear member for sweeping the peripheral chamber of fluid upon the rotation of the outer gear member in the housing, inlet and outlet porting means disposed, respectively, on opposite sides of the vane each adjacent and open to the defined peripheral fluid chamber operable upon rotation of the outer gear member for transferring the fluid through the peripheral chamber, a passageway of fixed volume in said housing to communicate the outlet porting means of the pumping gear set chambers to the inlet porting means of the metering peripheral chamber, a second passageway of fixed volume in said housing between the outlet porting means of the pumping gear set and the inlet porting means of the pumping gear set, and a check valve in said second passageway opened whenever the pressure at the inlet porting means of said peripheral chamber exceeds the inlet pressure at said pumping chamber by a predetermined amount with said valve being held open in response to all pressures in excess of said predetermined amount to pass all liquid in excess of that accepted by said metering chamber.

2. For use in an oil burner, the improvement being a combination pumping and metering device for drawing against a suction at least as great as 25" Hg and for metering accurately continuous flow rates as low as .3 gallon per hour, comprising a housing having an internal cylindrical cavity, means for pumping including a gear set consisting of outer and inner gear members with said outer gear member having a plurality of internal teeth and said inner gear member having a different plurality of external gear teeth progressively engaged with the teeth of said outer gear member in response to rotation relative each other within said cavity to solely define a plurality of variable sized rotatable liquid oil pumping chambers, shaft means to support the inner gear member eccentrically of the outer gear member and housing cavity and to drive the gear members at different rates within the housing, inlet and outlet porting means open to the gear set operable to provide for fluid transfer through the defined fluid chambers, means for metering including a cylindrical periphery on the external surface of the outer gear member having at least one flattened portion on its cylindrical periphery each of which defines with the cylindrical cavity of the housing a peripheral chamber of relatively small fixed volume, a vane supported within a radial slot in the housing and being of width substantially equal to the axial length of the defined peripheral chamber, means for biasing said vane to engage the periphery of the outer gear member for sweeping the peripheral chamber of fluid upon the rotation of the outer gear member, and inlet and outlet porting means disposed, respectively, generally on opposite sides of the vane each open to the defined peripheral fluid chamber upon rotation of the outer gear member for transferring the fluid through the peripheral chamber, a passageway of fixed volume formed within the housing to communicate the outlet porting means of the gear set pumping chambers with the inlet porting means of the peripheral chamber, a second passageway of fixed volume formed in said housing to communicate both the outlet porting means of said gear set pumping chambers and the inlet porting means of said peripheral chamber with the inlet porting means of said gear set pumping chambers, bypass check valve means in said second passageway opened whenever the pressure at the inlet porting means of said peripheral chamber exceeds the inlet pressure at said pumping chamber by a predetermined amount with said valve being held open in response to all pressures in excess of that accepted by said metering chamber, whereby the speed of rotation of the outer gear member and the number and volume of each of the peripheral chambers determine accurately the fluid volume output of the device, and a recess in said housing on one side of said vane and communicating said outlet porting means of said peripheral chamber with said peripheral chamber and cooperating with said vane to restrain solid contaminants carried by the fluid in said peripheral chamber from entering said peripheral chamber outlet port.

References Cited by the Examiner

UNITED STATES PATENTS

| | | | |
|---|---|---|---|
| 998,779 | 8/1911 | Jordan | 123—14 |
| 1,770,141 | 8/1930 | Meyer | 230—149 |
| 1,839,485 | 1/1932 | King | 230—158 |
| 1,978,441 | 10/1934 | Svenson | 103—5 |
| 2,024,133 | 12/1935 | Harding | 103—5 |
| 2,132,813 | 10/1938 | Wahlmark | 103—126 |
| 2,358,275 | 9/1944 | Hess | 103—124 |
| 2,918,013 | 12/1959 | Eames | 103—126 |
| 3,166,063 | 1/1965 | Schettler | 103—5 |

MARK NEWMAN, *Primary Examiner.*

SAMUEL LEVINE, *Examiner.*

WILLIAM FREEH, *Assistant Examiner.*